Figure 1:
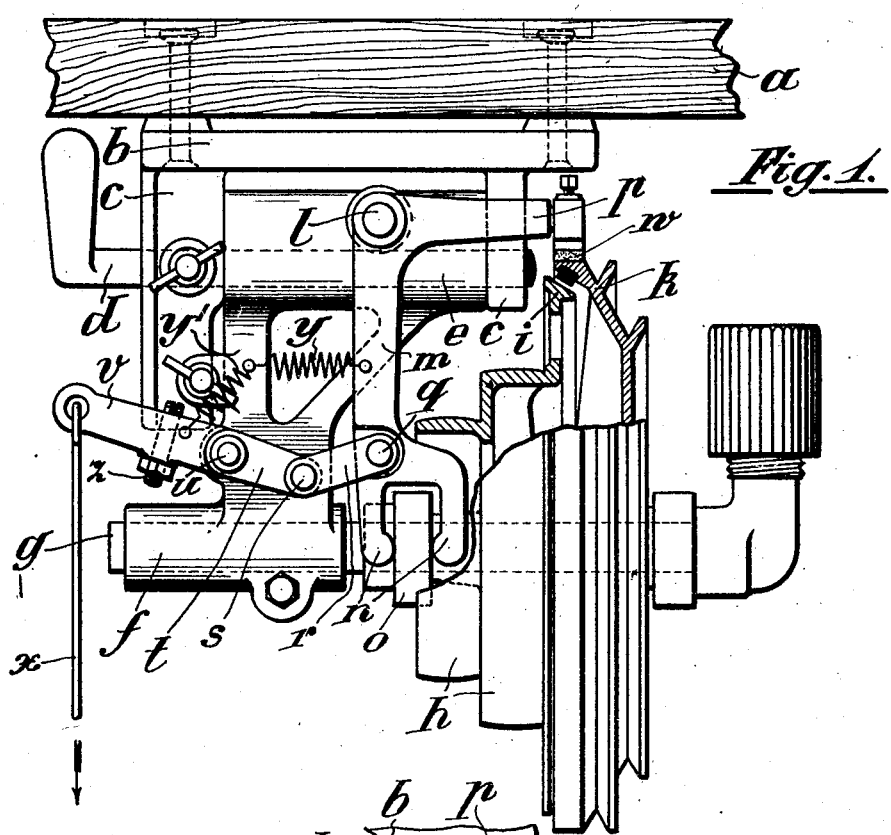

Dec. 30, 1930.  K. MAIER  1,786,955

FRICTION CLUTCH DRIVING MECHANISM

Filed Sept. 2, 1927

Patented Dec. 30, 1930

1,786,955

UNITED STATES PATENT OFFICE

KARL MAIER, OF STUTTGART, GERMANY, ASSIGNOR TO UNION SPECIAL MASCHINEN-FABRIK G. M. B. H., OF STUTTGART, GERMANY

FRICTION-CLUTCH-DRIVING MECHANISM

Application filed September 2, 1927, Serial No. 217,222, and in Germany September 11, 1926.

The present invention relates to friction driving mechanism, particularly suitable for sewing machines.

Friction drives have already been used for driving sewing machines in which the friction disc of the clutch is coupled with a pulley for the sewing machine drive by actuating a rocking lever by means of a foot pedal. In such known drives of this type however the seamstress has to maintain the clutch permanently in engagement during the sewing operation so that the friction effect is maintained solely by constant foot pressure.

Such drives are for the most part provided with a brake shoe for the pulley driven by the friction disc which, on the one hand is under spring action and on the other hand is lifted during the stitching process from the driven pulley and must be maintained in this position against the spring action mentioned.

As not only the engagement of the friction clutch, but also the lifting of the brake shoe is effected by the foot lever it follows that the seamstress must not only maintain the friction effect by foot pressure but also retain the brake shoe in its inoperative position by foot pressure.

For short intermittent sewing operations it may not be inconventient to operate the two devices by foot pressure, but it is obvious that when working for a considerable time with the foot constantly in action the seamstress becomes tired and the foot is also tired in sympathy.

The object of the invention is to reduce the foot pressure necessary for operating the friction clutch and to dispense with it altogether or as far as possible during the sewing operation.

According to the present invention after the rocking lever or double arm has been depressed by means of a foot lever thereby engaging the friction clutch the latter is held in the position of friction by suitable means without maintenance of the foot pressure. A link may advantageously be used as the means aforementioned which on actuating the rocking lever is completely or substantially completely extended.

As a result of this it is possible to construct the rocking lever as a double lever, one lever arm of which is connected with the link which in turn is connected with an engaging arm. In order to be able to adjust the extended position of the link a set screw is provided on the rocking lever or double arm lever. Finally the engaging arm has two portions at an angle to each other, one having a bifurcated end to which is fitted the link whilst the other arm carries a brake shoe for the belt pulley.

Figure 2:
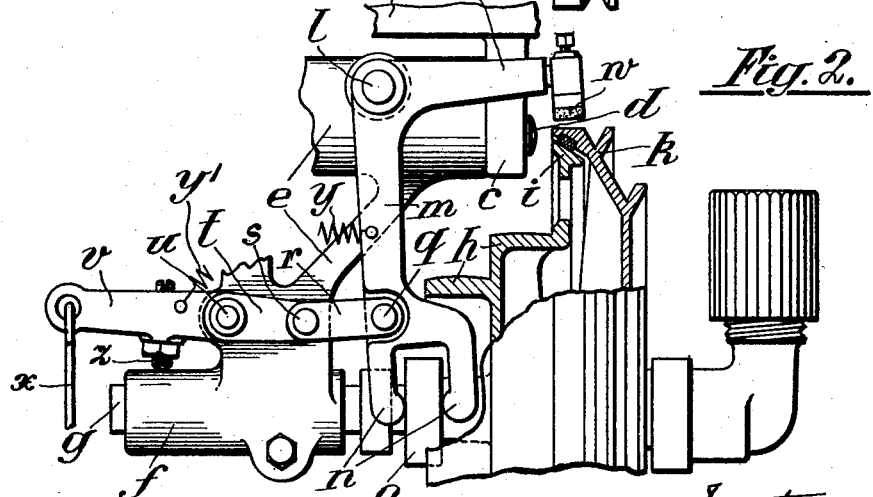

The invention is more particularly described with reference to the accompanying drawings in which:

Figure 1 is a front elevation of a friction drive for a sewing machine provided with the improvement, whilst Figure 2 is a similar view in a different position of the elements, a portion of the device being removed for the purpose of clearness.

The sewing plate $a$ has a bearing plate $b$ in the bearing hole $c$ of which is mounted an axle $d$ which in turn carries the mounting $e$. The latter is provided with a bearing $f$ for an axle $g$, which, on the one hand is adapted to receive the belt pulley $h$ with the friction disc $i$, and on the other hand the belt pulley $k$ which is connected by means of a belt with the driving wheel of the sewing machine.

The bifurcated ends $n$ of an engaging arm $m$ pivotally mounted at $l$ grip a driver $o$ which is connected with the boss of the belt pulley $h$ so that on a rocking movement of the engaging arm $m$ the driver $o$, belt pulley $h$ and friction disc $i$ are displaced to the right on the axle $g$ and the friction disc $i$ is coupled with the belt pulley $k$ to be driven.

The engaging lever $m$ is however according to the example shown, constructed as a double armed lever $m$, $p$, the element $m$ carrying a link $r$ pivotally mounted at $q$ which is articulated at $s$ with the arm $t$ of a double rocking lever $t$, $v$, pivotally mounted at $u$ whilst the other element $p$ of the engaging lever carries a brake shoe $w$ which bears against the belt pulley $k$ and retains this in the position of rest.

The rocking lever $v$ is connected by means of a rod $x$ or chain with a foot lever, which is not shown, operated by the seamstress. A spring $y$ attached to the bracket for the bearing $f$ and also to the lever $m$ normally tends to move the lever $m$ so as to disengage the clutch and cause the brake shoe $w$ to engage the belt wheel. The spring $y'$ is connected to this bracket and to the lever $v$ and this spring normally tends to lift the left hand end of the lever $v$ when the treadle is released. This also tends to buckle the toggle connection for permitting the belt wheel to be released and stopped.

The apparatus is operated as follows:—

The belt pulley $h$ and friction ring $i$ run continuously. As soon as any stitching is to be effected the seamstress depresses the foot lever, the rod $x$ moves in the direction of the arrow (Figure 1) so that the rocking lever $v$, $t$, is swung about its mounting $u$. The link $r$ is entrained in this movement so that the element $t$ of the lever and the link $r$ come into an extended or nearly extended position as shown in Figure 2. This action results in the engaging arm constructed as a double armed lever $m$, $p$, swinging about its mounting $l$ thereby on the one hand raising the brake shoe $w$ from the belt pulley $k$ and on the other hand displacing the bifurcated ends $n$ of engaging arm $m$, the driver $o$, belt pulley $h$ and friction disc $i$ and accordingly engaging the friction clutch so that the belt pulley $k$ is now driven.

The effect of the link $r$ being brought into wholly or nearly wholly extended position is on the one hand the tensioning of the spring $y$ and also a tensioning of the spring $y'$. The link $r$ when in alignment with the lever $t$, $v$ holds the lever with the brake released and the friction clutch in engagement so that the machine is operated. This takes all the load off from the operator. When the treadle is released the spring $y'$ will lift the left hand end of the lever $t$, $v$, thus buckling the toggle and the combined action of the spring $y'$ and the spring $y$ will cause the brake to be applied and hold the brake applied, thus releasing the operator from the strain of holding the parts in position for rendering the machine idle.

Finally, it is also provided that the extended position of the link $r$ is fixed, this being effected by means of a set screw $z$ which also allows of adjustment of the extended position of the link $r$ so that the point of articulation $s$ can be displaced.

Having now particularly described and ascertained the nature of my said invention and in what manner the same is to be performed, I declare that what I claim is:—

A friction clutch driving mechanism including in combination an element to be driven, a driving member movable into frictional engagement therewith, an engaging lever having connection with said driving member for shifting the same into and out of engagement with the driven member, a brake carried by said engaging lever and adapted to engage the driven member when the driving member is released therefrom, a spring for moving said engaging lever so as to disengage the driving member from the driven member, a rocking lever, a link interposed between said rocking lever and said engaging lever, said link and rocking lever being movable into alignment when the driving member is in engagement with the driven member for holding said members in engagement, a stop for limiting the movement of said rocking lever when said link and lever are in alignment, a spring for moving said rocking lever to throw the link and lever out of alignment, and a manually operated device connected to said rocking lever for moving the same to bring the link and lever into alignment and the driving member into clutching engagement with said driven member.

In testimony whereof, I affix my signature.

KARL MAIER.